United States Patent [19]
Berry et al.

[11] Patent Number: 6,111,581
[45] Date of Patent: Aug. 29, 2000

[54] METHOD AND SYSTEM FOR CLASSIFYING USER OBJECTS IN A THREE-DIMENSIONAL (3D) ENVIRONMENT ON A DISPLAY IN A COMPUTER SYSTEM

[75] Inventors: Richard Edmond Berry; Scott Harlan Isensee, both of Georgetown, Tex.; David John Roberts, Stockton, United Kingdom

[73] Assignee: International Business Machines Corporation, Armonk, N.Y.

[21] Appl. No.: 08/789,343

[22] Filed: Jan. 27, 1997

[51] Int. Cl.[7] ................................ G06T 17/00
[52] U.S. Cl. .......................... 345/419; 345/418
[58] Field of Search ..................... 345/418, 419, 345/420, 440

[56] References Cited

U.S. PATENT DOCUMENTS 5,261,044  11/1993  Dev et al. .
5,276,785  1/1994  Mackinlay et al. .
5,751,931  5/1998  Cox et al. .............................. 345/440

OTHER PUBLICATIONS

Mackinlay, Jock D.; Card, Stuart K.; Robertson, George G.; Rapid Controlled Movement Through a Virtual 3D Workspace, *Computer Graphics*, vol. 24, No. 4, Aug. 1990.

*Primary Examiner*—Phu K. Nguyen
*Assistant Examiner*—Cliff N. Vo
*Attorney, Agent, or Firm*—Sawyer & Associates; Volel Emile

[57] ABSTRACT

A method and system for classifying user objects in a three-dimensional environment on a display of a computer system is disclosed. The method and system comprises providing a set of standardized classes of user objects and defining the standardized classes based upon a users needs. The method and system is directed toward a classification for objects relevant to the tasks of organizing the 3D environment, navigating through the 3D environment, and performing useful work in the 3D user environment in a computer system classification. The distinction between classes of objects in the classification is based on user needs and is reflected in the properties and behaviors of objects as perceived by the users.

10 Claims, 8 Drawing Sheets

METHOD AND SYSTEM FOR CLASSIFYING USER OBJECTS IN A THREE-DIMENSIONAL (3D) ENVIRONMENT ON A DISPLAY IN A COMPUTER SYSTEM

CROSS-REFERENCE TO RELATED APPLICATIONS

The present application is related to application Ser. No. 08/789,332, filed on Jan. 27, 1997 entitled "A Method and System for Providing Visual Hierarchy of Task Groups and Related Viewpoints of a Three-Dimensional Environment in a Display of a Computer System," application Ser. No. 08/789,345, filed on Jan. 27, 1997, entitled "A Method and System for Providing Preferred Face Views of Objects in a Three-Dimensional (3D) Environment on a Display in a Computer System," application Ser. No. 08/789,344, filed on Jan. 31, 1997, entitled "Method and System for Navigating Through Opaque Structures on a Display," application Ser. No. 08/789,341, filed on Jan 27, 1997 entitled "A Method and System for Effectively Controlling an Object in a Three-Dimensional Environment in a Display of a Computer System," and application Ser. No. 08/789,342, filed on Jan. 27, 1997 entitled "A Method and System for Providing an Improved view of an Object in a Three-Dimensional (3D) Environment on a Computer Display" filed on the same date as the present application and assigned to the assignee of the present application.

TECHNICAL FIELD

The present invention relates generally to organizing objects and navigating within a three-dimensional (3D) environment within a display in a computer system and more particularly relates to providing a classification of user objects in such a display.

BACKGROUND

Presently in a computer environment the screen or display on the computer has a plurality of icons and windows thereon. In a typical environment including a window and a pointing device, to access certain information it is important to point to and then click on a particular icon or window. Oftentimes, this type of environment is not efficient unless the user has a specific understanding of the particular nomenclature and syntax of the particular environment of the computer. Hence, a user that is not familiar with that syntax or nomenclature could become easily confused and spend a significant amount of time trying to understand how to navigate and access certain information. This can cause user frustration as well as create considerable inefficiency in the system.

Three dimensional (3D) representations are known for example, to be utilized in games or reality world environments in a computer system. User navigation within 3D spaces and interaction with 3D objects, such as found in computer games and in virtual reality worlds using virtual reality modeling language (VRML) on the Internet, is made difficult because there is no logical and cohesive set of distinctions for differences between objects. Object properties and behaviors during navigation and user interaction should be supportive of users' tasks, and follow a consistent pattern when implemented by various developers and object providers. In addition, a computer game is not an environment where useful work is accomplished, such as in a business environment.

There is currently no set of standardized distinctions or object classification scheme for use in a 3D environment in which useful work is accomplished. Ease of use and productivity will be crucial aspects of making 3D user environments easy to use and productive in such an environment. Having a consistent scheme supportive of navigation and predictable object interaction is extremely important.

What is needed is a system and method for enhancing the use of certain aspects of a 3-D environment where useful work is done on a computer display, without creating undue complexity. The system should be easy to implement and compatible with existing computer systems. The present invention addresses such a need.

SUMMARY

The present invention provides a method and system for classifying user objects in a three-dimensional environment on a display of a computer system. The method and system comprises providing a set of standardized classes of user objects and defining the standardized classes based upon a users needs.

The present invention is directed toward a classification for objects relevant to the tasks of organizing the 3D environment, navigating through the 3D environment, and performing useful work in the 3D user environment in a computer system classification. The distinction between classes of objects in the classification is based on user needs and is reflected in the properties and behaviors of objects as perceived by the users.

DETAILED DESCRIPTION

The present invention relates to organizing and navigating within a three-dimensional (3D) environment within a display on a computer system. The following description is presented to enable one of ordinary skill in the art to make and use the illustrative embodiment and is provided in the context of a patent application and its requirements. Various modifications to the illustrative embodiment will be readily apparent to those skilled in the art and the generic principles herein may be applied to other embodiments. Thus, the illustrative embodiment is not intended to be limited to the embodiment shown but is to be accorded the widest scope consistent with the principles and features described herein.

Figure 1:
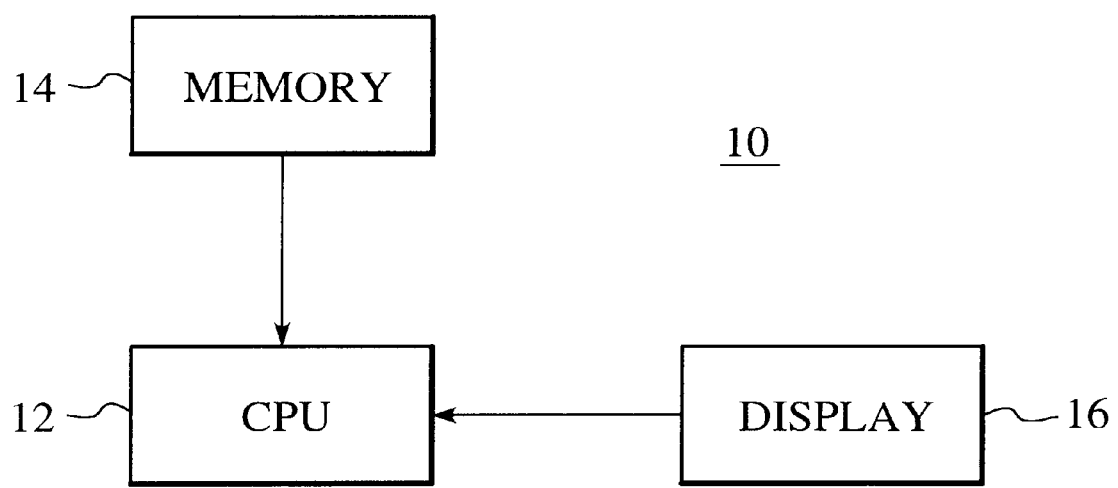
FIG. 1 is a block diagram of a computer system.
Figure 2:
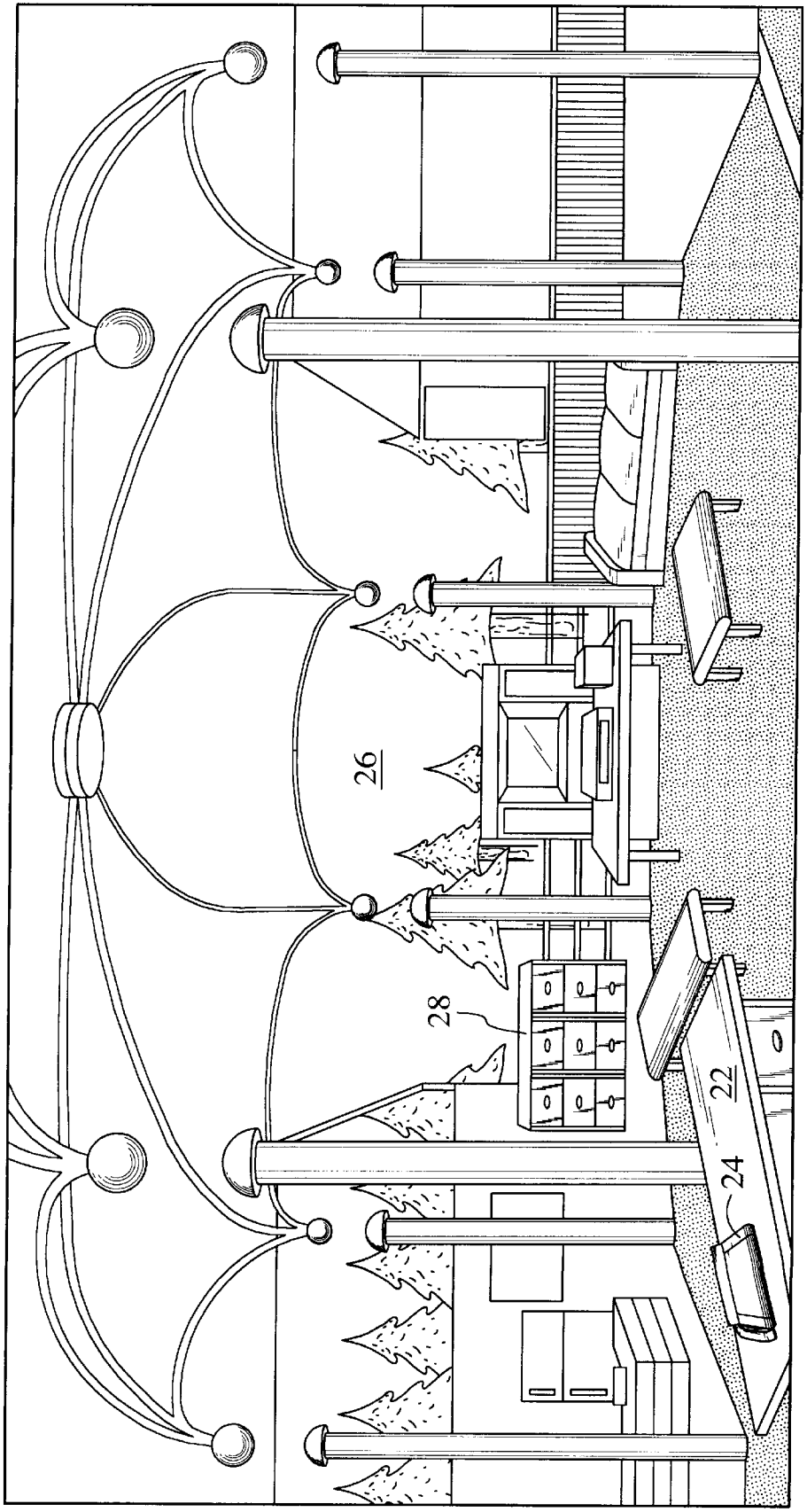
FIG. 2 is a three dimensional representation inside a home on a display of a computer system.

In the present invention, three dimensional ("3D") representations are utilized to show particular environments on a display 16 of a computer system 10 as shown in FIG. 1. For example, a home environment can be depicted on the display utilizing various 3D representations. Referring now to FIG. 2, what is shown is a 3D representation of a home 20 in which there is a desk 22, telephone 24, atrium 26, file cabinets 28, and other objects that make up the 3D representation. This 3D representation of certain of these objects can be containers for different information. For example, the desk 22 could include drawers, each of the drawers includes files, as in a typical office environment.

In a 3D environment in accordance with the present invention, a user viewpoint can navigate through the home in two ways. One way to navigate in the environment is for the user viewpoint to move through the home through the movement of the pointing (mouse, cursor or the like) device to simulate walking through the room. The other way to navigate in the environment is through providing certain events to facilitate user viewpoint movement from one point to another through the 3D environment.

Hence, to facilitate this second example, it is desirable to use these objects as containers in the appropriate fashion to provide the particular information. So, for example, using a pointing device such as a mouse or the like in a Windows environment, a desk could be pointed to and clicked on, the user viewpoint would then move closer to the desk, in a position where the drawers could be seen. A particular drawer could be clicked on and then opened, revealing a plurality of files. Thereafter, a particular file could be clicked on, and a representation of that file would be removed from the drawer and provided for access to the user viewpoint. Thereafter, the user could then click on the file and flip through the various documents in the file.

In another example, the telephone could be clicked on to bring the user viewpoint closer to the telephone. The user could then dial a number by using the keypad on the telephone to dial a particular number. In addition, there may be a fax facility on the telephone which could be used in which the computer system would then act as a fax machine. Accordingly, by using this 3D representation, using various objects in a 3D representation as containers rather than the typical Windows environment in which there are a plurality of windows and icons to be clicked on that may or may not be representative of the particular task that is to be performed, a system is provided in which it would be easier for a user to navigate and use in an expeditious and efficient manner.

This 3D representation allows for certain advantages while performing useful works. These advantages will be described below in conjunction with the accompanying figures.

In a three dimensional environment as above described, it is desirable to provide a standard system to allow for organization of objects in the 3D environment and navigation between objects in the environment. There is currently no set of standardized distinctions or object classification scheme. Ease of use and productivity are crucial aspects of making 3D user environments easy to use and productive. Therefore, by providing a consistent scheme supportive of navigation and predictable object interaction, the present invention allows for a more productive system for organizing objects in the 3D environment and navigating between objects.

The user object classification is supportive of organizing objects and navigation between objects and user interaction with objects in a 3D environment. It also supports the user tasks necessary to accomplish meaningful work and facilitates the creation of object-oriented frameworks for implementation of 3D user environments.

Figure 3:
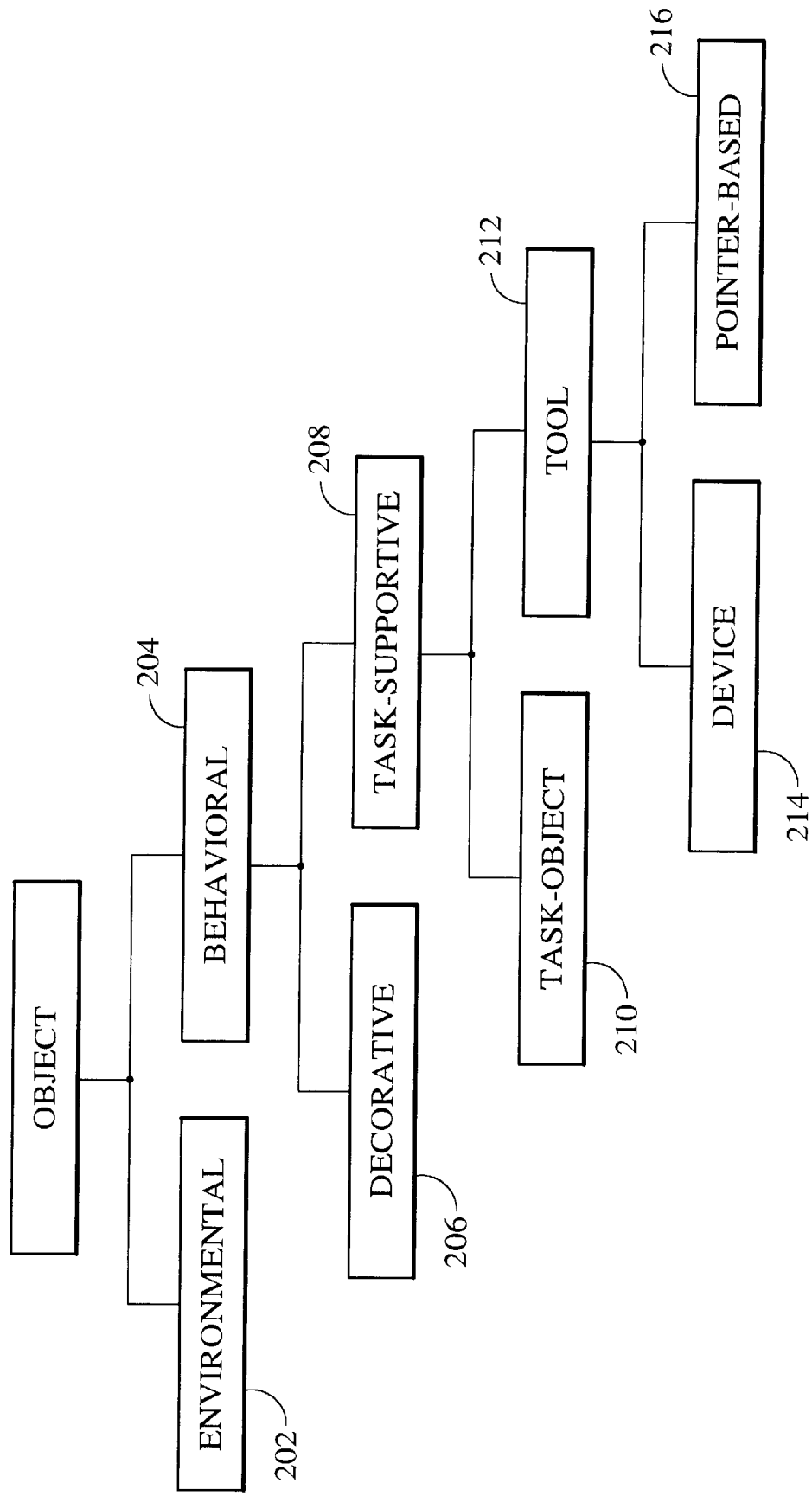
FIG. 3 is a block diagram which illustrates user object classification in accordance with the present invention.

To more clearly describe the features of the present invention, refer now to FIG. 3. FIG. 3 is a block diagram which illustrates user object classification in accordance with the present invention. Accordingly, environmental objects 202 and behavioral objects 204 are a first class of objects. In a subclass of the behavioral objects 204, there are decorative objects 206 and task supportive objects 208. The task supportive object has further subclasses of task objects 210 and tool objects 212. Finally the tool object is defined by device objects 214 and pointer based objects 216.

Each of the classes and subclasses of objects is standardized and classified on a consistent basis. Furthermore, the distinction between each of the classes and subclasses are defined by a user need and the user's ability to intuitively understand the particular properties of each object or container. For example, referring back to FIG. 2, there are some objects that are in the 3D environment for purely environmental reasons, such as the trees 30 or the like. On the other hand, there are clearly other objects there that are utilized to perform tasks such as the telephone 26. A system and method in accordance with the present invention classifies each of these objects in such a manner that allows the user to more easily interface with the display in a three dimensional environment.

To more clearly illustrate objects 202–216 shown in FIG. 3, the distinguishing characteristics for each class include but are not limited to:

Environmental Objects 202

Create spaces that define the world

Figure 4:
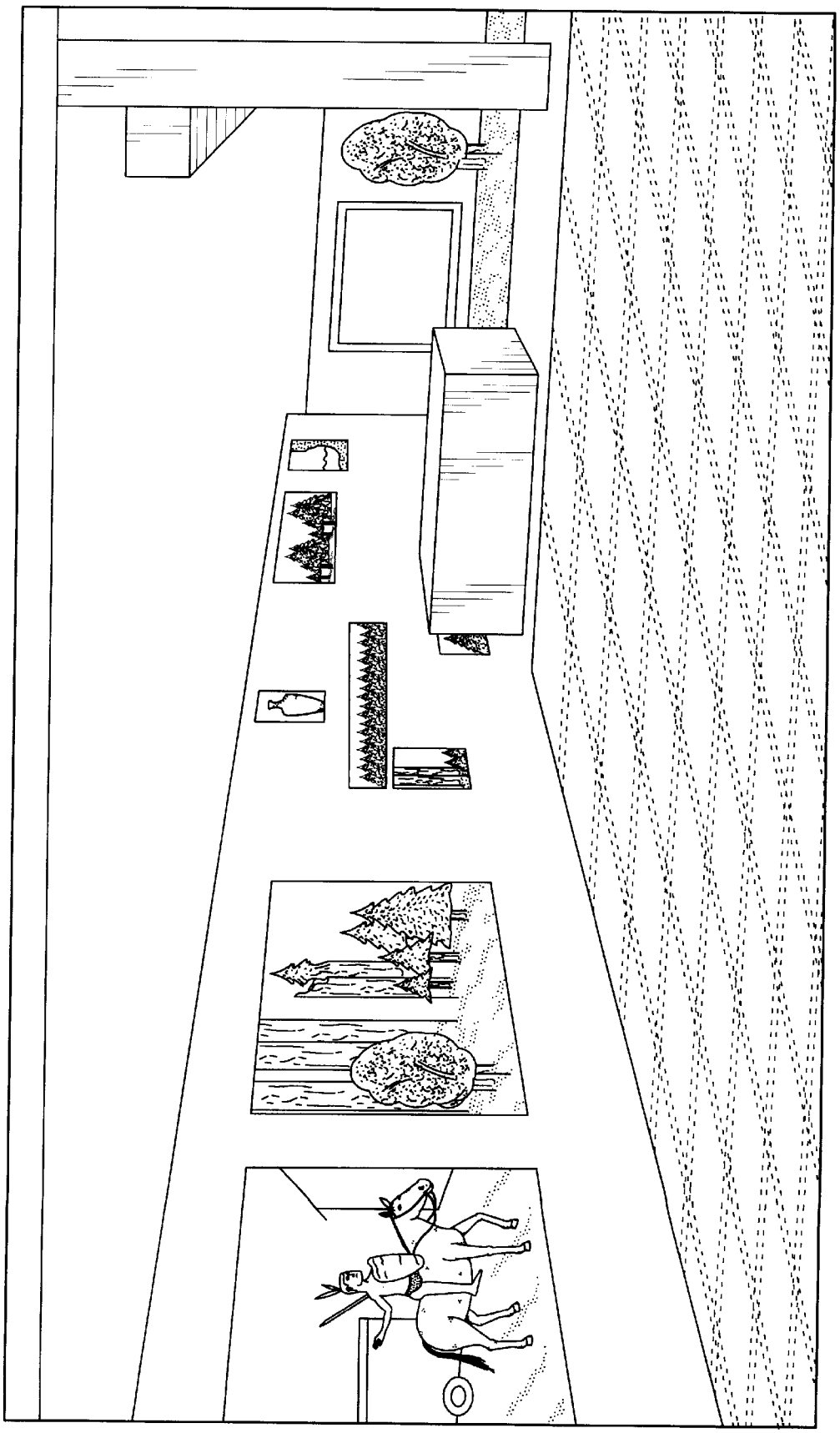
FIG. 4 is an illustration of a 3D representation that includes environmental objects.

Establish atmosphere and style, for example, contemporary or Victorian architecture May support navigation, for example, moves the user's viewpoint when clicked upon May have a floor property that contributes to setting the user's viewing height Provide points of reference and position-landmarks Surfaces may contain and group other objects, such as a wall that holds paintings Spaces allow for logical groupings of objects to match task usage May provide user assistance, for example, a wall may provide assistance to help the user arrange the paintings Do not provide work views Don't take keyboard or voice focus, for example, clicking on the wall would not assign the keyboard to the table May provide a properties notebook FIG. 4 is an illustration of a 3D representation that includes environmental objects. Examples of environmental objects are mountains, clouds, lakes, walls, floors, columns, railings, and walkways. In FIG. 4 the ground, floors, stairs, and platforms would use the floor property to adjust the user's viewing point. Walls, clouds, railings, and water would typically not. In addition, mountains, lakes, and clouds and the like may not support navigation.

Behavioral Objects 204

Support navigation to views of themselves

Support user interaction

May contain and group other objects

May provide user assistance

Provide a properties notebook

Common Properties of Behavioral Objects

Identifier/name

Location and size in the world

Associated viewpoints

Visual rendering/styles

Properties notebook

Figure 5:
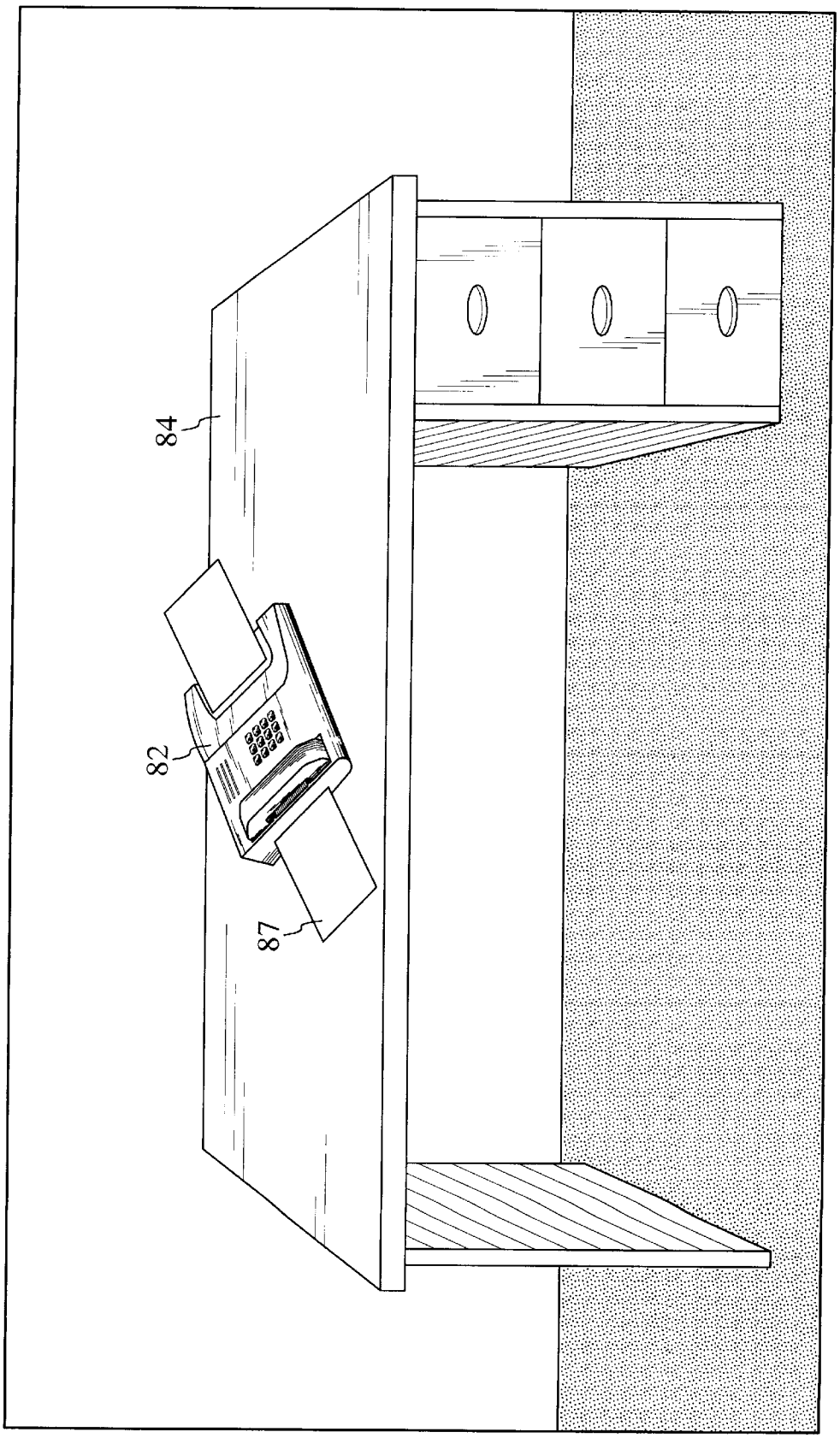
FIG. 5 illustrates examples of behavioral objects.

FIG. 5 illustrates examples of behavioral objects. Examples of behavioral objects are fax documents 87, a fax machine 82, and a desk 84 have identities, locations, and sizes in the world. Typically, properties are accessed using a properties notebook associated with each object.

Property Notebook for Behavioral Objects

Figure 6:
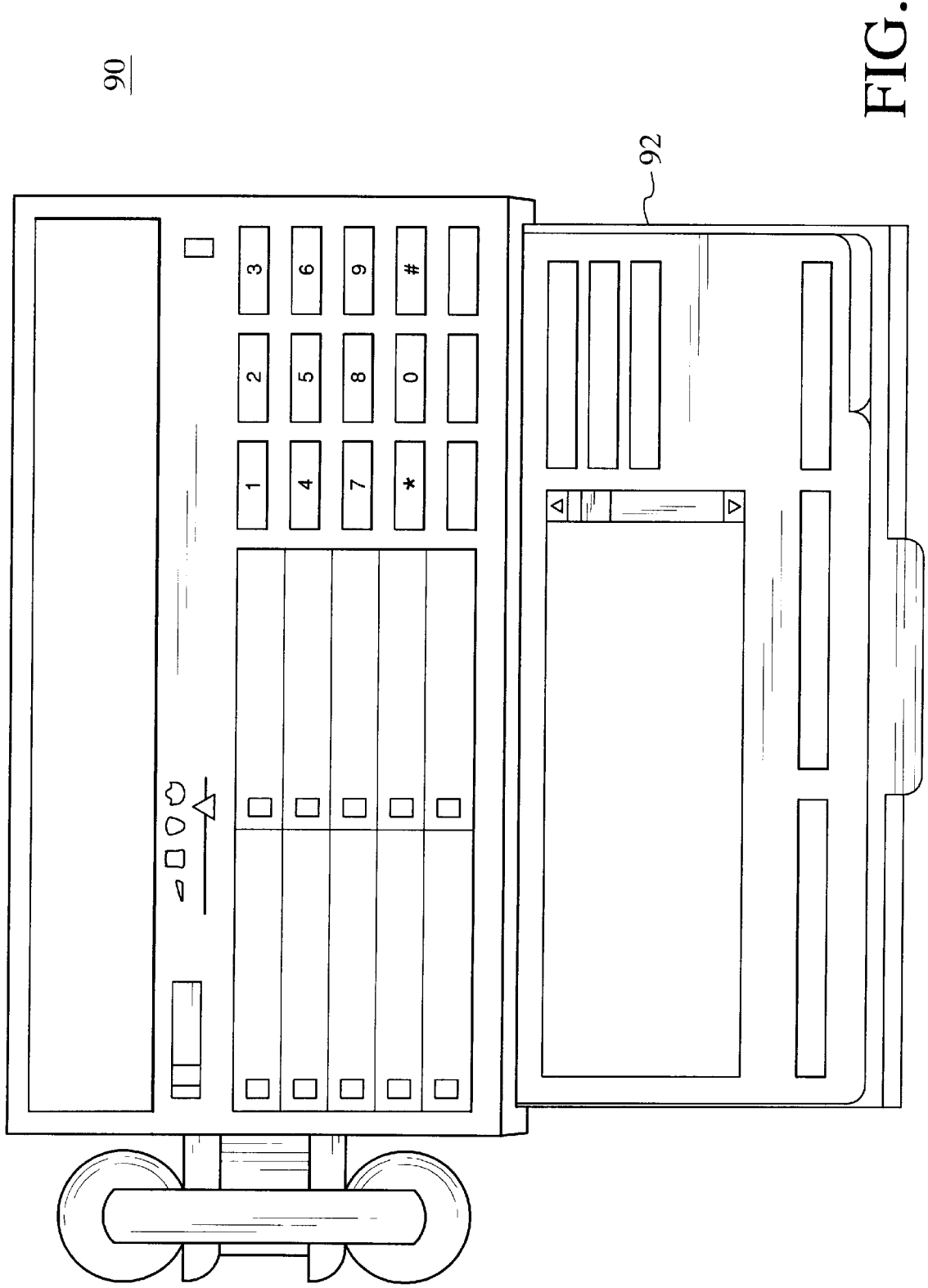
FIG. 6 illustrates an example of a property notebook for a behavioral object.

FIG. 6 illustrates an example of a property notebook for a behavioral object. FIG. 6 shows a phone 90 in which a tabbed notebook is provided in an animated slide out tray 92. The property notebook typically contains alternative views, properties, instructions, and other information related to an object. A tabbed notebook is the preferred visual paradigm. The notebook is contained within the object or attached to it as appropriate. Suggested mechanisms for accessing the property notebook on documents are sticky notes, paper clips, or a tool (pair of glasses) that shows and/or filters object properties.

Decorative Objects 206

Figure 7:
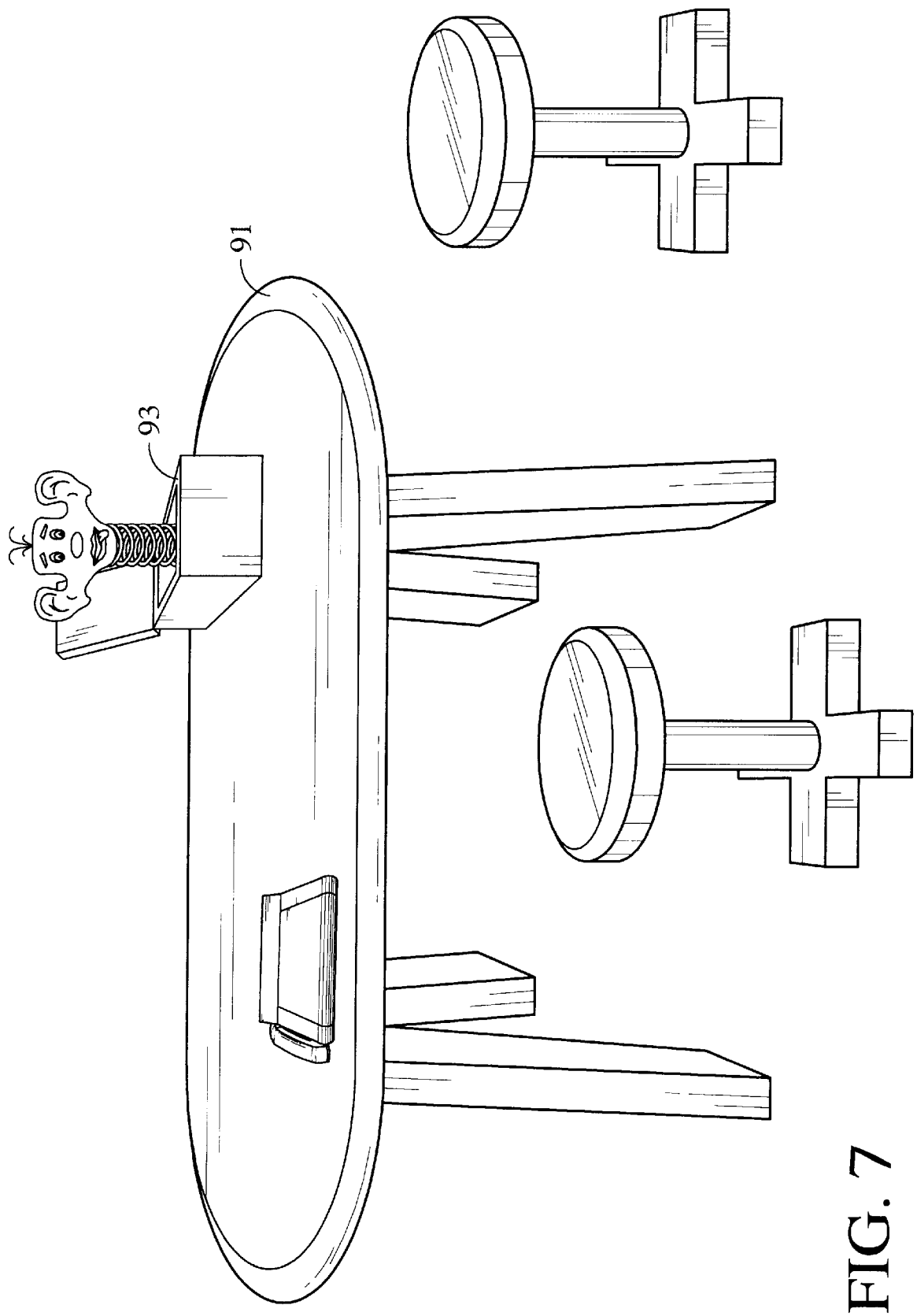
FIG. 7 illustrates an example of decorative objects, in this example a jack-in-the-box on a table.

- Reinforce atmosphere and style
- Are attractive and entertaining
- Support navigation and may serve as landmarks
- Have simple interactions with the user, for example, a pack in the box would open when the user clicked on it
- May contain and group other objects
- May provide user assistance
- Do not provide work views, by convention, for example FIG. 7 illustrates an example of decorative objects in this example a jack-in-the-box 93 on a table 91. Examples of decorative objects such as flowers, a jack-in-the-box, animated paintings and photographs. The lack of work views is a convention, not an architectural aspect. The implementation would probably use the same base classes for both decorative and task-supportive objects.

Task Supportive Objects 208

- Support the desired user tasks
- Support navigation to views that facilitate interaction
- Are highly interactive and animated
- May contain and group other objects
- Provide user assistance
- Provide both world and work views Examples of task supportive objects are books, desks, bookcases, clocks, CDs, video tapes, telephones, forms, pads of paper, pencils and pens.

Task Object 210

- Represent the user's information
- Primary facility for performing user tasks

Tool Objects 212

Figure 8:
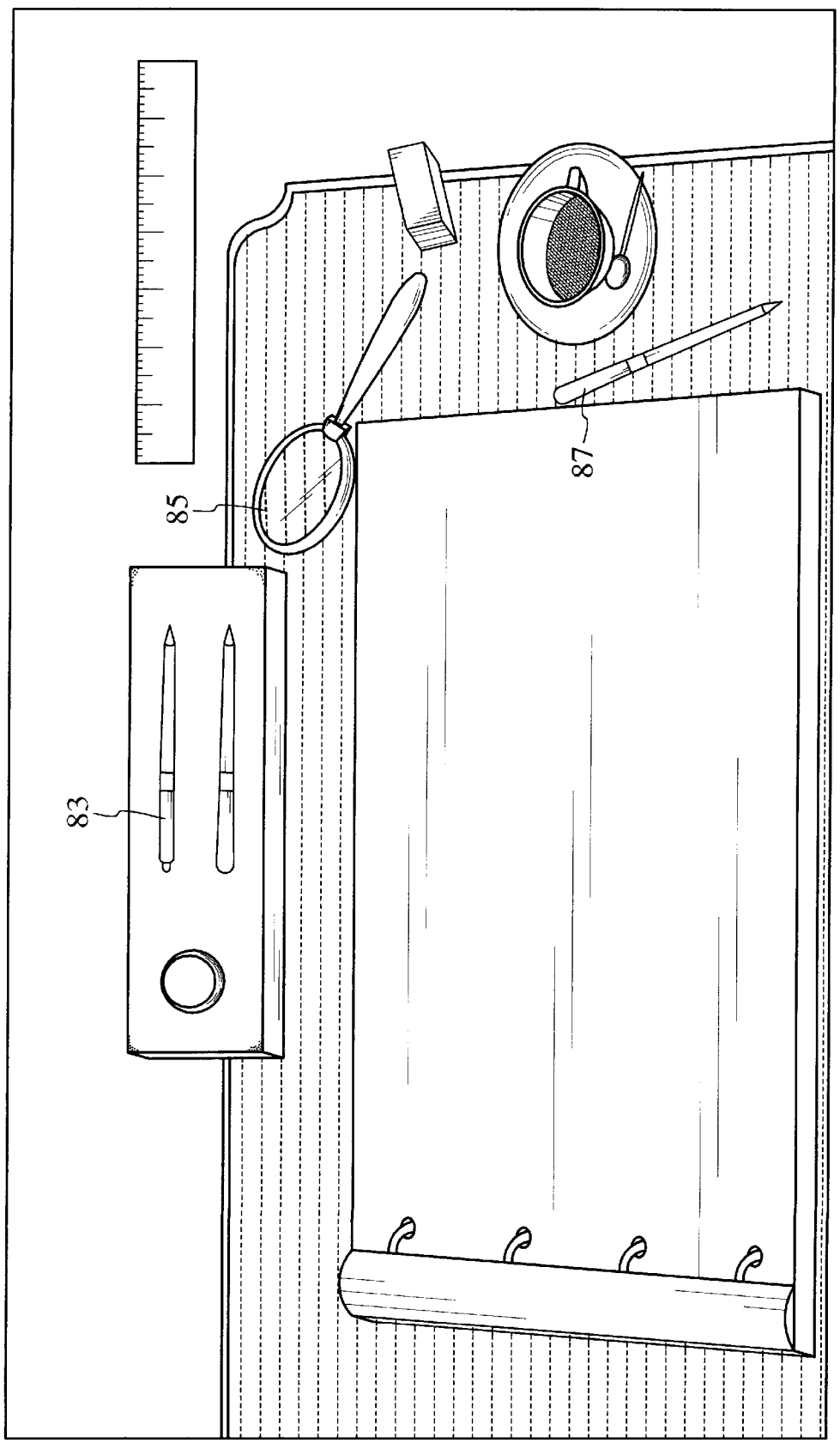
FIG. 8 illustrates tools for task supportive behavioral objects.

- Perform actions on other objects
- Usually work with a variety of objects types
- Two styles of tool interaction:
  Pointer-based
  Devices
- Pointer-based tools are 'picked up' as the pointer, are used on one or more objects, and are then 'put down'
- Devices are targets of drag/drop and pick-up/put-down of objects FIG. 8 illustrates tools for task supportive behavioral objects. Examples shown of tool objects are pens 83, brushes 85, magnifying glasses 89 are examples of pointer-based work.

Device Object 214

- Act on other objects brought to them
- Typically not affected themselves

Pointer-based 216

- Change the mode of the pointer
- Act on the object or view under the pointer

Accordingly, in a system and method in accordance with the present invention, a set of standard definitions for object types provides a consistent and extensible 3D user environment adequate for the performance of real user tasks. The proposed object classification is based on distinctions useful to users in performing their tasks in a 3D environment. It can support intuitive organization and navigating and object interaction techniques within a 3D environment, and it can be implemented in a repeatable manner using either object-oriented or non-object-oriented techniques.

Although the system and method has been described in accordance with the embodiments shown, one of ordinary skill in the art will readily recognize that there could be variations to the embodiments and those variations would be within the spirit and scope of the above-described system and method. Accordingly, many modifications may be made by one of ordinary skill in the art without departing from the spirit and scope of the appended claims.

What is claimed is:

1. A method for classifying objects in a three-dimensional environment on a display of a computer system; the method comprises the steps of:

providing a set of standardized classes of objects; and defining the standardized classes based upon a user specification, the user specification based upon the properties and behavior of the objects as perceived by the user.

2. The method of claim 1 in which the set of standardized classes comprises environmental objects and behavioral objects as a first class of objects.

3. The method of claim 2 in which the behavioral objects further includes a subclass which includes decorative objects and task supportive objects.

4. The method of claim 3 in which the task supportive objects further include a subclass which includes task objects and tool objects.

5. The method of claim 4 in which the tool objects further include a subclass which includes device objects and pointer based objects.

6. A system for classifying objects in a three-dimensional environment on a display of a computer system, the system comprising:

means for providing a set of standardized classes of objects; and means for defining the standardized classes based upon a user specification, the user specification based upon the properties and behavior of the objects as perceived by the user.

7. The system of claim 6 in which the set of standardized classes comprises environmental objects and behavioral objects as a first class of objects.

8. The system of claim 7 in which the behavioral objects further includes a subclass which includes decorative objects and task supportive objects.

9. The system of claim 8 in which the task supportive objects further include a subclass which includes task objects and tool objects.

10. The system of claim 9 in which the tool objects further include a subclass which includes device objects and pointer based objects.

* * * * *